United States Patent [19]

Matsuoka et al.

[11] Patent Number: 5,523,905
[45] Date of Patent: Jun. 4, 1996

[54] RECORDING OR REPRODUCING APPARATUS WITH TAPE GUIDE MEMBERS PROVIDING A SPACE TO RECEIVE A TAPE-END SENSOR

[75] Inventors: Hidetoshi Matsuoka, Sekimachihigashi; Junji Kobayashi, Tokyo, both of Japan

[73] Assignee: Canon Kabushiki Kaisha, Tokyo, Japan

[21] Appl. No.: 309,627

[22] Filed: Sep. 21, 1994

Related U.S. Application Data

[63] Continuation of Ser. No. 837,933, Feb. 20, 1992, abandoned.

[30] Foreign Application Priority Data

Feb. 26, 1991 [JP] Japan .................................. 3-030764

[51] Int. Cl.⁶ .................................................. G11B 15/08
[52] U.S. Cl. .............................. 360/85; 360/95; 360/74.6
[58] Field of Search .............................. 360/85, 95, 84, 360/132, 74.6

[56] References Cited

U.S. PATENT DOCUMENTS 4,616,274 10/1986 Nagaoka ................................ 360/85
4,807,077 2/1989 Zaitsu et al. ........................... 360/85
5,025,332 6/1991 Tsuchida et al. ...................... 360/85

*Primary Examiner*—Stuart S. Levy
*Assistant Examiner*—Kevin M. Watkins
*Attorney, Agent, or Firm*—Fitzpatrick, Cella, Harper & Scinto

[57] ABSTRACT

A recording or reproducing apparatus for performing recording or reproduction by winding a tape around a rotary drum on which a plurality of heads are mounted includes a tape supply side guide post and a tape take-up side guide post for guiding the tape to the rotary drum, a tape supply side guide member and a tape take-up side guide member for respectively guiding the tape supply side guide post and the tape take-up side guide post, and a sensor for detecting an end portion of the tape. The sensor moves along a space portion formed by the tape supply side guide member and the tape take-up side guide member as the tape is being loaded and is located in the space portion when tape loading is completed.

17 Claims, 4 Drawing Sheets

RECORDING OR REPRODUCING APPARATUS WITH TAPE GUIDE MEMBERS PROVIDING A SPACE TO RECEIVE A TAPE-END SENSOR

This application is a continuation of application Ser. No. 07/837,933, filed Feb. 20, 1992, now abandoned.

BACKGROUND OF THE INVENTION

1. Field of the Invention

The present invention relates to a recording or reproducing apparatus, and more particularly, to a guide member for guiding a guide post of a tape and its positional relationship with a tape end detecting sensor.

2. Description of the Related Art

FIG. 1 is a schematic view of the essential parts of an example of a compact video cassette recorder which is available on the market. Such a video cassette recorder includes a stationary chassis 102 on which a rotary drum 100 with a plurality of heads (not shown) mounted thereon is provided, and a movable chassis 106 on which reel mounts (not shown) engaging with hubs (not shown) of a tape cassette 104 are provided. When a tape 108 is loaded, the movable chassis 106 moves in a direction indicated by arrow C so as to change the relative position between the stationary chassis 102 and the movable chassis 106.

In the aforementioned type of video cassette recorders, a guide member 114 having guide grooves 114a and 114b is fixed to the stationary chassis 102, while a tape end detecting sensor 116 is fixed to the movable chassis 106. When the tape 108 is loaded, guide posts 110 and 112 move along the guide grooves 114a and 114b of the guide member 114 together with the movable chassis 106 and thereby draw out the tape 108 toward the drum 100. When loading of the tape 108 is completed, the tape end detecting sensor 116 is located above the guide member 114, as shown in FIG. 2.

In the aforementioned conventional video cassette recorder, since the tape end detection sensor 116 is located above the guide member 114 when loading of the tape is completed, the thickness of the apparatus is increased.

SUMMARY OF THE INVENTION

A primary object of the present invention is to provide a recording or reproducing apparatus which enables the size and thickness of the apparatus to be further reduced.

A secondary object of the present invention is to provide a recording or reproducing apparatus which enables a distance through which guide posts are moved to be increased, i.e., which enables a tape loading distance to be increased, so as to reduce damage to the tape, while achieving reduction in the size of the apparatus.

In accordance with one aspect of the invention, a recording or reproducing apparatus comprises a rotary drum for recording data on or reproducing data from a tape-like recording medium, tape winding means for winding the recording medium, and a supply side guide post and a tape take-up side guide post for guiding the recording medium across the rotary drum. A tape supply side guide member guides the tape supply side guide post such that it is located on a tape entrance side relative to the rotary drum when loading of a tape is completed, and a tape take-up side guide member guides the tape take-up side guide post such that it is located on a tape exit side relative to the rotary drum when loading of the tape is completed. In addition, a sensor detects a running state of the recording medium, and the tape supply side guide member and the tape take-up side guide member form a space portion therebetween, and the sensor moves along the space portion as the tape is being loaded and is located in the space portion when tape loading is completed.

In accordance with another aspect of the invention, a recording or reproducing apparatus comprises a rotary drum for recording data on or reproducing data from a tape-like recording medium contained in a cassette, tape winding means for winding the recording medium, a stationary chassis on which the rotary drum is provided, and a movable chassis engaging with the stationary chassis in such a manner as to be movable relative to the stationary chassis, with the cassette being insertable on the movable chassis. A tape supply side guide post and a tape take-up side guide post guide the recording medium across the rotary drum, and a tape supply side guide member guides the tape supply side guide post such that it is located on a tape entrance side relative to the rotary drum when loading of a tape is completed, and a tape take-up side guide member guides the tape take-up side guide post such that it is located on a tape exit side relative to the rotary drum when loading of the tape is completed. An end portion of the tape supply side guide member and an end portion of the tape take-up side guide member are located between the cassette and the movable chassis when tape loading is completed.

In accordance with another aspect of the invention, a recording or reproducing apparatus comprises a rotary drum for recording data on or reproducing data from a tape-like recording medium contained in a cassette, tape winding means for winding the recording medium, a stationary chassis on which the rotary drum is provided, and a movable chassis engaging with the stationary chassis in such a manner as to be movable relative to the stationary chassis, with the cassette being insertable on the movable chassis. A tape supply side guide post and a tape take-up side guide post guide the recording medium across the rotary drum, and a tape supply side guide member guides the tape supply side guide post such that it is located on a tape entrance side relative to the rotary drum when loading of a tape is completed, and a tape take-up side guide member guides the tape take-up side guide post such that it is located on a tape exit side relative to the rotary drum when loading of the tape is completed. The tape supply side guide member and the tape take-up side guide member form a space portion therebetween which is closer to the movable chassis than the rotary drum.

In accordance with another aspect of the invention, a recording or reproducing apparatus comprises a rotary drum for recording data on or reproducing data from a tape-like recording medium contained in a cassette, tape winding means for winding the recording medium, a stationary chassis on which the rotary drum is provided, and a drum base fixed to the stationary chassis for holding the rotary drum. In addition, a movable chassis engages with the stationary chassis in such a manner as to be movable relative to the stationary chassis, with the cassette being insertable on the movable chassis. A tape supply side guide post and a tape take-up side guide post guide the recording medium across the rotary drum, and a tape supply side guide member guides the tape supply side guide post such that it is located on a tape entrance side relative to the rotary drum when loading of a tape is completed, and a tape take-up side guide member guides the tape take-up side guide post such that it is located on a tape exit side relative to the rotary drum when loading of the tape is completed. A sensor detects an end portion of the recording medium, wherein the tape supply side guide member and the tape take-up side guide member form a space portion therebetween which is closer to the movable chassis than the rotary drum, and the sensor moves into the space portion during the tape loading and is located therein when tape loading is completed.

Other objects and features of the present invention will be apparent from the following description taken in connection with the accompanying drawings.

DETAILED DESCRIPTION OF THE PREFERRED EMBODIMENT

An embodiment of a video cassette recorder to which the present invention is applied will be described in detail below with reference to the accompanying drawings.

Figure 1:
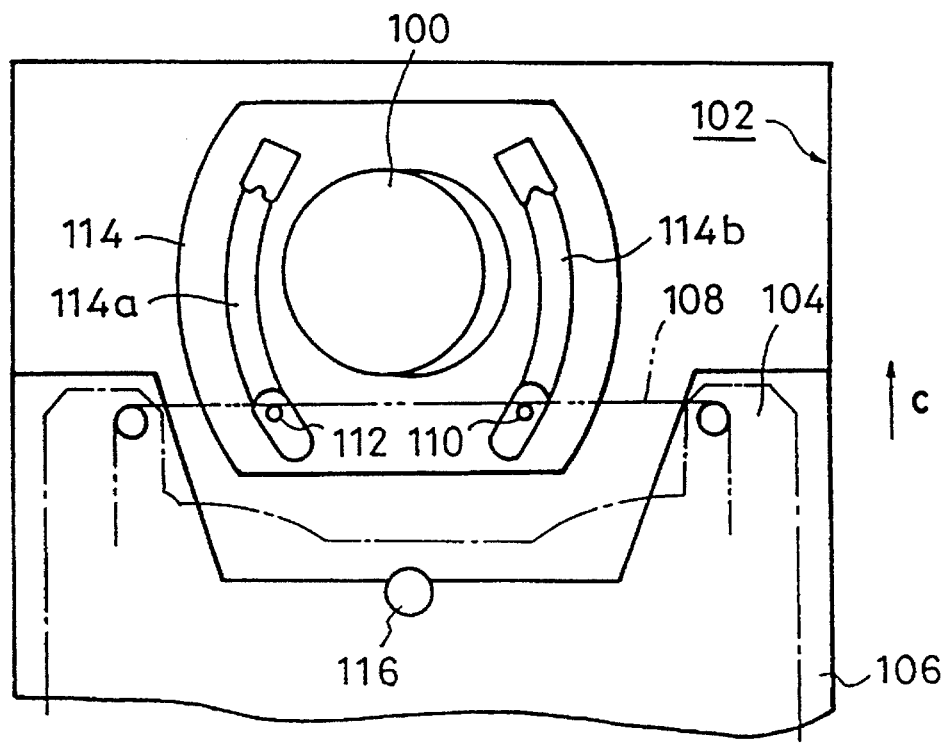
FIG. 1 is a schematic view of the essential parts of an example of a conventional compact video cassette recorder.
Figure 2:
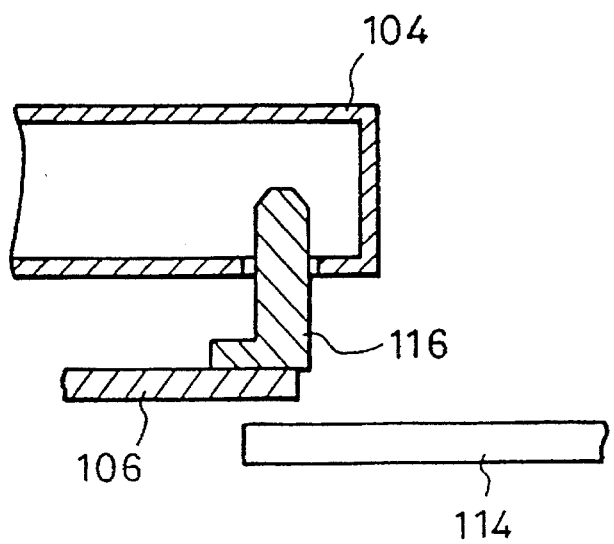
FIG. 2 is a cross-sectional view illustrating the positional relation between a guide post guiding member and a tape end detecting sensor in the axial direction of a drum when a tape is loaded in the video cassette recorder shown in FIG. 1.
Figure 3:
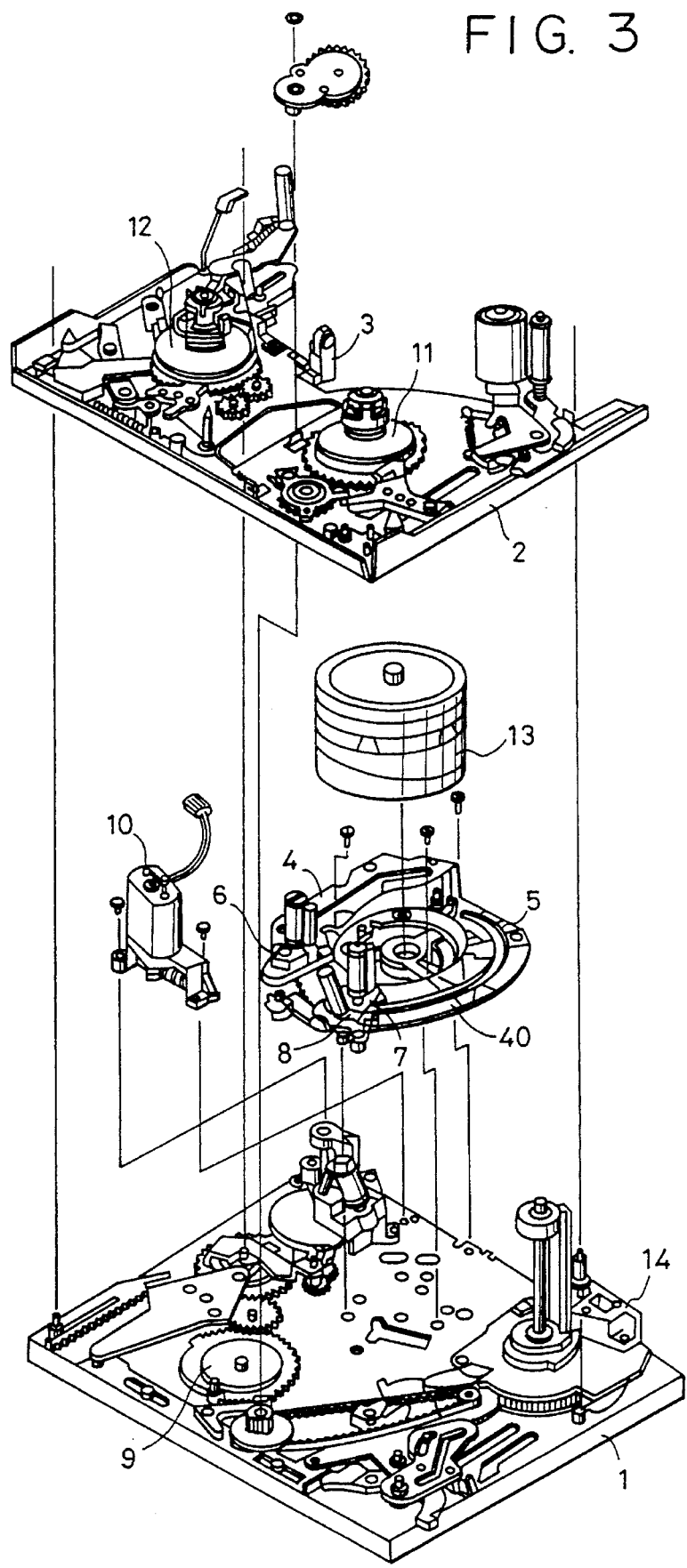
FIG. 3 is an exploded perspective view illustrating an embodiment of a video cassette recorder to which the present invention is applied.

FIG. 3 is an exploded perspective view of a video cassette recorder. In the video cassette recorder shown in FIG. 3, a drum base 5, a tape supply side guide post guiding member (hereinafter referred to as a supply side guide member) 4 and a tape take-up side guide post guiding member (hereinafter referred to as a take-up side guiding member) 40 are disposed on a stationary chassis 1.

A rotary drum unit 13 is provided on the drum base 5. The rotary drum unit includes a fixed drum fixed to the drum base 5, and a rotary drum rotatably supported by the fixed drum and having a plurality of heads (not shown) on the peripheral surface thereof. The rotary drum is rotated by a motor (not shown) incorporated in the rotary drum unit.

A movable chassis 2 engages with the stationary chassis 1, and is movable toward and away from the rotary drum unit 13. A tape end detecting sensor 3 and reel mounts 11 and 12, engaged with reel hubs (not shown) provided on a cassette 15 (FIG. 4), are disposed on the movable chassis 2.

Figure 4:
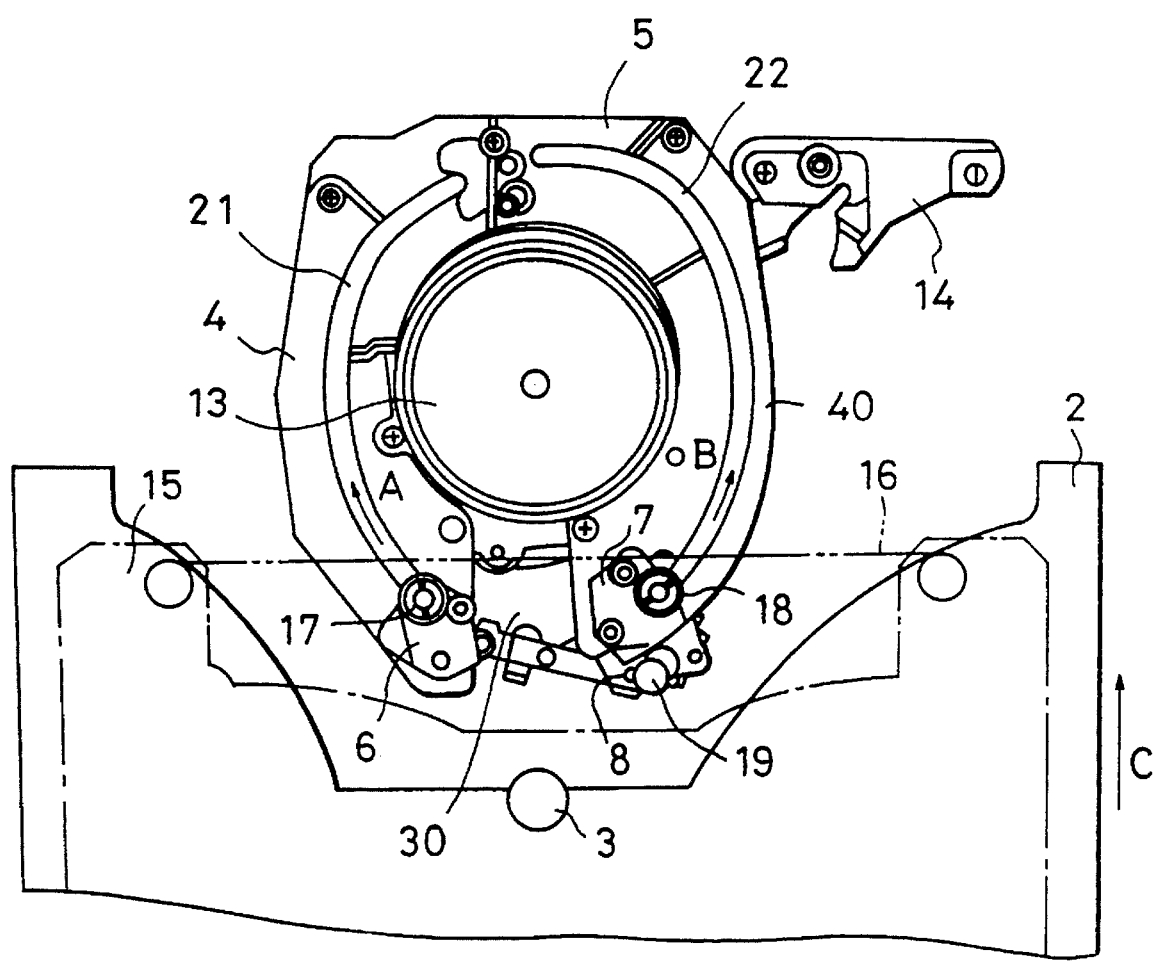
FIG. 4 is a plan view illustrating the relation between the two guide post guide members and the tape end detecting sensor while no tape is loaded.

The movable chassis 2 is spaced from the drum unit 13, as shown in FIG. 4, in an unloading state of the tape. The movable chassis 2 moves in a direction indicated by arrow C in FIG. 4 synchronously with the loading operation of a tape 16.

The gearing mechanisms used to wind the recording medium in forward and rearward directions, as well as the means for reproducing data from and/or recording data on the recording medium shown in FIG. 3 are well known, per se, to those skilled in the art and are therefore not discussed in detail.

FIG. 4 illustrates the relation between the two guiding members 4 and 40 and the sensor 3 in the unloading state of the tape. Guide posts 17, 18 and 19 are respectively provided on a supply side guide post base (hereinafter referred to as a supply side base) 6, a first take-up side guide post base (hereinafter referred to as a first take-up side base) 7 and a second take-up side guide post base (hereinafter referred to as a second take-up side base) 8. The supply side base 6 is slidably fitted into a guide groove 21 formed by the supply side guide member 4 and the drum base 5, while the first take-up side base 7 is slidably fitted into a guide groove 22 formed by the take-up side guide member 40 and the drum base 5.

Figure 5:
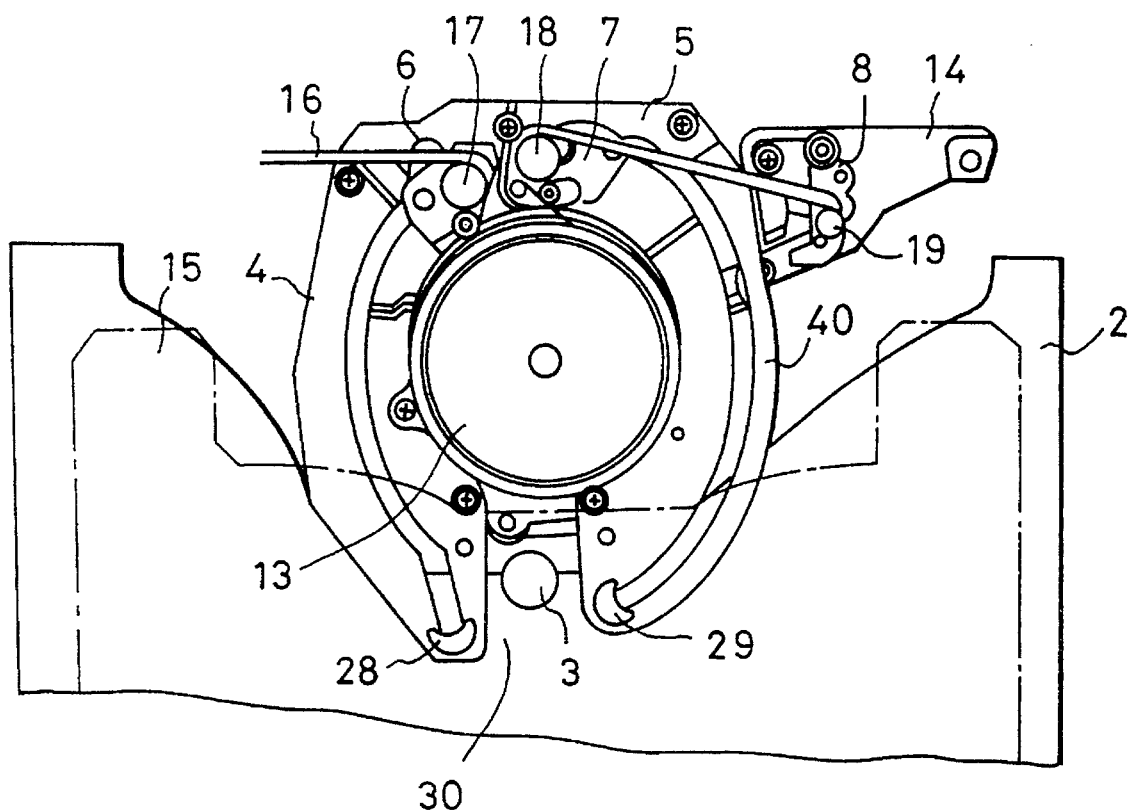
FIG. 5 is a plan view illustrating the relation between the two guide post guide members and the tape end detecting sensor when loading of a tape is completed.

When the tape is loaded, the supply side base 6 and the first take-up side base 7 respectively slide along the guide grooves 21 and 22 synchronously with rotation of a loading motor 10 (FIG. 3) and thereby guide the tape 16 in directions indicated by arrows A and B in FIG. 4 so as to allow it to be wound around the drum unit 13, as shown in FIG. 5. At that time, the second take-up side base 8 also moves and guides the tape 16 in a direction indicated by arrow C in FIG. 4. The second take-up side base 8 is positioned at a base 14, as shown in FIG. 5, when loading of the tape is completed. In FIG. 5, reference numerals 28 and 29 respectively denote stoppers for receiving the guide posts 17 and 18, when no tape is loaded.

When the tape is loaded, the movable chassis 2 engaging with a gear 9 (FIG. 3) is also subjected to the rotating force of the loading motor 10 and moves in the direction indicated by arrow C in FIG. 4. As the movable chassis 2 moves, the sensor 3 provided on the movable chassis 2 moves along a space portion 30 formed by the two guiding members 4 and 40 in the direction indicated by the arrow C. When loading of the tape 16 is completed, the sensor 3 is thus positioned in the space portion 30, as shown in FIG. 5.

Figure 6:
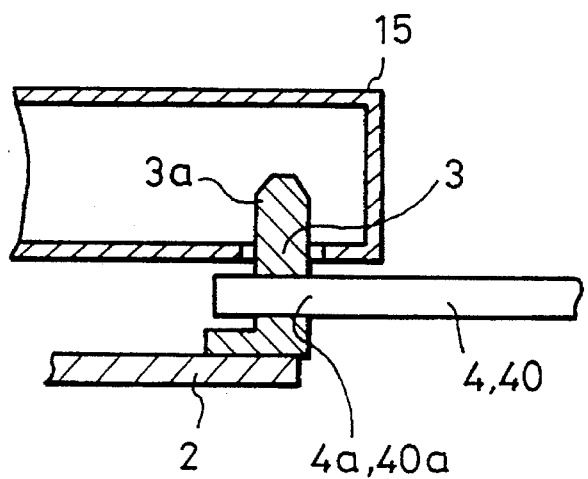
FIG. 6 is a cross-sectional view illustrating the positional relation between the guide post guide member and the tape end detecting sensor in the axial direction of the drum.

FIG. 6 shows the positional relation between the sensor 3 and the guide members 4 and 40 in the axial direction of the rotary drum unit 13 when loading of the tape is completed. A detecting portion 3a of the sensor 3 fixed to the movable chassis 2 is inserted into a cassette 15. Both an end portion 4a of the guide member 4 and an end portion 40a of the guide member 40 are located on the rear side of the sensor 3 and between the lower end portion of the cassette 15 and the upper surface of the movable chassis 2.

In this embodiment, since the guide grooves 21 and 22 for the guide posts are formed by the three members, i.e., the supply side guide member 4, the take-up side guide member 40 and the drum base 5, the space portion 30 is formed by the guide members 4 and 40. However, a space portion 30 may be formed in a single member in which the guide grooves are formed.

As will be understood from the foregoing description, in this embodiment, when a tape 16 is loaded, the tape end detection sensor 3 moves along the space portion 30 formed by the guide member 4 for the tape supply side guide post 17 and the guide member 40 for the tape take-up side guide post 18. The tape end detection sensor 3 is thus located in the space portion 30 when loading of the tape is completed. Consequently, the thickness of the guide members 4 and 40 can be included in the length of the sensor 3, and the thickness of the entire apparatus can thus be reduced.

Furthermore, the guide members 4 and 40 are provided on the stationary chassis 1, while the sensor 3 is provided on the movable chassis 2. When loading of the tape is completed, the end portions 4a and 40a of the guide members 4 and 40 are located between the tape cassette 15 and the movable chassis 2. Consequently, the movable chassis 2 can move without interfering with the members provided on the guide members 4 and 40, such as the stoppers 28 and 29, and the guide grooves 21 and 22 can thus be made longer than those in the conventional apparatus. As a result, while the overall size of the apparatus is reduced, the distance through which the guide posts 17 and 18 are moved, i.e., the tape 16 loading distance, can be increased, thus reducing damage to the tape 16.

What is claimed is:

1. A recording or reproducing apparatus using a cassette having a hole formed therein, comprising:

a rotary drum for recording data on or reproducing data from a tape-like recording medium within the cassette;

tape winding means for winding the recording medium;

a tape supply side guide post and a tape take-up side guide post for guiding the recording medium across said rotary drum;

a tape supply side guide member for guiding said tape supply side guide post such that it is located on a tape entrance side relative to said rotary drum when tape loading is completed;

a tape take-up side guide member for guiding said tape take-up side guide post such that it is located on a a tape exit side relative to said rotary drum when tape loading is completed; and a sensor for detecting a running state of the recording medium, said sensor having a length extending in one direction and being positioned in the hole formed in the cassette when the cassette is inserted into the apparatus, wherein said tape supply side guide member and said tape take-up side guide member form a space portion therebetween, and also have a width extending in the one direction of the length of said sensor, and wherein said sensor moves along the space portion and is located therein such that the width of said guide members is within the length of said sensor when tape loading is completed.

2. A recording or reproducing apparatus according to claim 1, further comprising a stationary chassis, and a movable chassis engaged with said stationary chassis in such a manner as to be movable in a first direction relative to said stationary chassis, wherein said rotary drum is provided on said stationary chassis and the recording medium is mountable on said movable chassis.

3. A recording or reproducing apparatus according to claim 2, wherein said sensor extends in a second direction which is perpendicular to the first direction of movement between said stationary chassis and said movable chassis.

4. A recording or reproducing apparatus according to claim 3, wherein said tape supply side guide member and said tape take-up side guide member are formed as a single member.

5. A recording or reproducing apparatus according to claim 2, wherein said tape supply side guide member and said tape take-up side guide member are provided on said stationary chassis.

6. A recording or reproducing apparatus according to claim 5, wherein said tape supply side guide member and said tape take-up side guide member have a guide groove along which one of said guide posts is guided.

7. A recording or reproducing apparatus according to claim 6, wherein an end portion of said tape supply side guide member and an end portion of said tape take-up side guide member are located between the cassette and said movable chassis when tape loading is completed.

8. A recording or reproducing apparatus according to claim 7, wherein said tape supply side guide member and said tape take-up side guide member are formed as a single member.

9. A recording or reproducing apparatus according to claim 1, wherein said tape supply side guide member and said tape take-up side guide member have a guide groove in which a corresponding one of said guide posts is guided.

10. A recording or reproducing apparatus according to claim 9, wherein said tape supply side guide member and said tape take-up side guide member are formed by a single member.

11. A recording or reproducing apparatus according to claim 1, further comprising a drum base for holding said rotary drum, wherein said drum base, said tape supply side guide member and said tape take-up side guide member form a guide portion for guiding said guide posts.

12. A recording or reproducing apparatus according to claim 11, wherein said guide portion defines grooves for guiding said guide posts.

13. A recording or reproducing apparatus according to claim 12, wherein said tape supply side guide member and said tape take-up side guide member are formed as a single member.

14. A recording or reproducing apparatus using a cassette having a hole formed therein, comprising:

a rotary drum for recording data on or reproducing data from a tape-like recording medium contained in a cassette;

tape winding means for winding the recording medium;

a first chassis on which said rotary drum is provided;

a second chassis engaging with said first chassis in such a manner as to be relatively movable to said first chassis, with the cassette being insertable on said second chassis;

a tape supply side guide post and tape take-up side guide post for guiding the recording medium across said rotary drum;

a tape supply side guide member for guiding said tape supply side guide post such that it is located on a tape entrance side relative to said rotary drum when tape loading is completed;

a tape take-up side guide member for guiding said tape take-up side guide post such that it is located on a tape exit side relative to said rotary drum when tape loading is completed;

a sensor for detecting an end portion of the recording medium, said sensor fixed on said second chassis and having a length extending in a direction substantially perpendicular to the direction of movement of said second chassis with respect to said first chasssis, with said sensor positioned in the hole formed in the cassette, wherein said tape supply side guide member and said tape take-up side guide member form a space portion therebetween and also have a width extending in substantially the same direction as the length of said sensor, and wherein said sensor moves along the space portion and is located therein such that the width of said guide members is within the length of said sensor when tape loading is completed.

15. A recording or reproducing apparatus according to claim 14, wherein said first chassis is stationary and said second chassis is movable relative to said first chassis.

16. A recording or reproducing apparatus according to claim 15, wherein the space portion is closer to said second chassis than said rotary drum.

17. A recording or reproducing apparatus according to claim 16, further comprising a drum base for holding said rotary drum, said drum base being fixed to said first chassis.

* * * * *

UNITED STATES PATENT AND TRADEMARK OFFICE
CERTIFICATE OF CORRECTION

PATENT NO. : 5,523,905
DATED : June 4, 1996
INVENTOR(S) : Matsuoka et al.

It is certified that error appears in the above-indentified patent and that said Letters Patent is hereby corrected as shown below:

COLUMN 5:

Line 25, "a a" should read --a--.

Signed and Sealed this

Twenty-sixth Day of November 1996

Attest:

BRUCE LEHMAN

Attesting Officer

Commissioner of Patents and Trademarks